United States Patent [19]

Morena

[11] Patent Number: 5,094,677
[45] Date of Patent: Mar. 10, 1992

[54] PREPARATION OF POLLUCITE CERAMICS

[75] Inventor: Robert M. Morena, Caton, N.Y.

[73] Assignee: Corning Incorporated, Corning, N.Y.

[21] Appl. No.: 664,084

[22] Filed: Mar. 4, 1991

[51] Int. Cl.$^5$ ............................................. C03C 10/10
[52] U.S. Cl. ........................................ 65/18.1; 65/33; 501/5; 501/6
[58] Field of Search ............... 501/5, 6; 65/30.1, 18.1, 65/18.4, 33

[56] References Cited

U.S. PATENT DOCUMENTS

| | | | |
|---|---|---|---|
| 3,723,140 | 3/1973 | Beall | 65/33 |
| 3,833,385 | 9/1974 | Adelsberg | 106/38.9 |
| 3,959,172 | 5/1976 | Brownell | 501/12 |

*Primary Examiner*—Richard V. Fisher
*Assistant Examiner*—John Hoffmann
*Attorney, Agent, or Firm*—C. S. Janes, Jr.

[57] ABSTRACT

The present invention is directed to a method for synthesizing highly crystalline pollucite articles at temperatures not exceeding 1650° C. The method comprises two general steps:

(a) a glass frit is prepared having a composition varying from approximately the stoichiometry of $Cs_2O.2SiO_2$ to approximately the stoichiometry of $Cs_2O.4SiO_2$ with, optionally, up to 5% $Al_2O_3$; and (b) that glass frit is reacted at a temperature between about 1000°–1650° C. with an $Al_2O_3$-containing material in sufficient amounts to yield a final product having a stoichiometry approximating that of pollucite.

17 Claims, No Drawings

PREPARATION OF POLLUCITE CERAMICS

BACKGROUND OF THE INVENTION

Extremely refractory ceramic materials, by their very nature, present a number of very difficult problems from a commercial processing standpoint. Their refractoriness customarily demands the use of ultra-high firing temperatures both to synthesize and to fabricate such materials into useful shapes. Those high temperatures practically guarantee that any laboratory process devised for synthesizing and shaping articles from very highly refractory materials will either be too uneconomical to justify scale-up to commercial production, or will require operating conditions exceeding the capabilities of standard manufacturing equipment.

An illustration of that situation is found in the mineral pollucite, a cesium-containing feldspathoid having the composition $Cs_2O\text{-}Al_2O_3\text{-}4SiO_2$ (abbreviated $CAS_4$). Pollucite is the most refractory silicate known, exhibiting a melting point above 1900° C. In addition to its high refractoriness, pollucite also demonstrates high temperature stability, low elastic modulus, a relatively low linear coefficient of thermal expansion, viz., about $20\text{-}30 \times 10^{-7}/°C$. over the temperature range of 0°–1000° C., thereby rendering it suitable for applications incurring thermal shock, and displays good resistance to attack by water and alkaline solutions.

The extreme refractoriness which makes pollucite such a desirable material also, unfortunately, makes it extraordinarily difficult to synthesize via traditional approaches. To illustrate:

U.S. Pat. No. 3,723,140 (Beall et al.) discloses the preparation of glass-ceramic bodies having crystal contents greater than 50% and, commonly, greater than 80% by volume, wherein pollucite constitutes the predominant crystal phase. The precursor glasses therefor required melting temperatures of 1850°–2000° C. in rhodium crucibles. Such processing conditions would be extremely difficult to justify for any large scale commercial operation.

In like manner, the preparation of pollucite via the sintering together of its individual constituent oxides has proven to be very difficult, again demanding extremely high firing temperatures.

Accordingly, the primary objective of the instant invention was to devise a method for synthesizing pollucite utilizing temperatures compatible with standard manufacturing equipment.

Hence, whereas higher temperatures can be employed, a particular objective of the present invention was to devise a method for preparing bodies of pollucite utilizing temperatures not exceeding 1650° C.

SUMMARY OF THE INVENTION

I have found that those objectives can be attained through a procedure I have defined as "reactive ceramming". The basis of the reactive ceramic procedure contemplates an in situ reaction between a glass frit and a reactant powder(s). That is, the procedure can be described in terms of the following schematic equation:

It is because the synthesis of pollucite crystals from a glass involves the combined actions of chemical reaction and devitrification that I have termed the process "reactive ceramming".

Whereas the production of crystallized bodies via the glass-ceramic process, which can be described schematically as

likewise involves a precursor glass, my process differs therefrom with respect to compositional restraints placed upon the precursor glass. Thus, because the emphasis in the glass-ceramic process customarily centers on maximizing the yield of crystals developed in the body, the starting glass must bear a close compositional correspondence to the desired final crystalline product. In contrast, the starting glass in reactive ceramming can differ greatly in composition from the desired end product inasmuch as the glass is only one of the raw materials in the reaction scheme. Although again, maximization of crystal concentration is the goal in reactive ceramming, the greater degree of compositional flexibility that the inventive process enjoys permits considerations such as glass melting temperature and glass forming capability to play a role in the selection of the precursor glass composition. In light of this factor, an investigation was undertaken to determine whether the reactive ceramming process would be operable to permit the synthesis of pollucite in a manner sufficiently practical to be commercially economical. One arbitrary processing restraint placed upon the investigation was that the temperatures involved ought not to exceed 1650° C., that temperature being deemed to represent the limit of standard manufacturing equipment.

The investigation demonstrated that the reactive ceramming technique is quite operable in producing highly crystalline pollucite bodies at temperatures not exceeding 1650° C. The method devised consists essentially of two general steps:

(a) a glass frit is prepared having a composition varying from that approximating the stoichiometry of $Cs_2O\cdot2SiO_2(CS_2)$ to that approximating the stoichiometry of $Cs_2O\cdot4SiO_2(CS_4)$; and (b) that glass frit is reacted with an $Al_2O_3$-containing material in sufficient amounts to produce a final product approximating the stoichiometry of pollucite.

Such glasses can be prepared by melting $Cs_2O$- and $SiO_2$-containing materials in the proper proportions at temperatures no higher than 1650° C. [Because those glasses are subject to hydration in the ambient environment, a minor amount of $Al_2O_3$ (about 1–5% by weight) was advantageously included to significantly improve the resistance of these glasses to hydration. Inasmuch as the practical limit of $Al_2O_3$ solubility in these glasses is about 5% by weight, to assure a very low level, if any, undissolved $Al_2O_3$ in the glass, additions of $Al_2O_3$ preferably did not exceed 4% by weight.] The glasses are comminuted to a finely-divided powder (frit).

The frits have been reacted with such $Al_2O_3$-containing materials as dehydrated kaolin, siliceous bauxite, and aluminas at temperatures below 1650° C., conveniently at temperatures between 1000°–1550° C., each of those materials being present as finely-divided powders. Whereas pollucite crystal-containing bodies are produced in all instances, the use of an alumina in powder form is preferred from the standpoint of maximum yield of pollucite and the highest density demonstrated in the end product.

Thus, the articles prepared via the reaction of frit with dehydrated kaolin exhibited some porosity with relatively little residual glass or other amorphous phase. Although the proportions of the frit and kaolin were designed to yield stoichiometric pollucite, both pollucite and $Cs_2O \cdot Al_2O_3 \cdot 2SiO_2$ were identified via x-ray diffractometry in the crystalline articles. It has been postulated that the latter phase may be a precursor to a pollucite solid solution phase. (The presence of a pollucite solid solution, assuming it involved silica enrichment, would preserve mass balance in the above reaction.)

The articles prepared via the reaction of frit with the siliceous bauxite contained pollucite, but also exhibited a large amount of residual glass.

The most preferred process involved the reaction of $CS_4$ frit with an alumina. Because the reaction between the frit and the alumina is surface-mediated, i.e., the particle size of the materials plays a role in the kinetics of the reaction, the mean particle size of the frit will not exceed about 30 microns, and will preferably range between about 2-20 microns. The mean particle size of the alumina will preferably be even smaller, i.e., less than 10 microns. For maximum yield of pollucite crystallization, the mean particle size of the alumina will not exceed about 2 microns. Hence, laboratory investigation has indicated that any increase in the particle size of the alumina leads to a decrease in the yield of pollucite crystals with a corresponding increase in the amount of uncombined reactants present, such as residual glass.

Because the reaction between the frit and the powdered $Al_2O_3$-containing material proceeds relatively slowly at temperatures in the cooler region of the effective firing range, with the rate thereof increasing significantly as the temperature is raised above 1000° C., temperatures of at least 1100° C. have been deemed to be more practical for commercial exploitation of the process.

Where the precursor glass is designed to approximate the stoichiometry of $CS_2$, its composition will consist essentially, expressed in terms of weight percent on the oxide basis, of 65-75% $Cs_2O$, 25-35% $SiO_2$, and, optionally, 1-5% $Al_2O_3$, the latter being included to improve the hydration resistance of the glass. Frit prepared from that glass will be mixed thoroughly with the powdered $Al_2O_3$-containing material, the amount of the latter being devised to yield a reaction product approximating the stoichiometry of pollucite. For example, when a powdered alumina comprises the $Al_2O_3$-containing material, it will generally be present at levels between about 10-35% by weight.

Where the precursor glass is designed to approximate the stoichiometry of $CS_4$, its composition will consist essentially, expressed in terms of weight percent on the oxide basis of 50-60% $Cs_2O$, 40-50% $SiO_2$, and, optionally, 1-5% $Al_2O_3$, the latter again being included to improve the hydration resistance of the glass. In like manner to the description above, frit prepared from that glass will be blended thoroughly with powdered $Al_2O_3$-containing material, the amount of the latter again being calculated to yield a reaction product approximating the stoichiometry of pollucite. When a powdered alumina constitutes the $Al_2O_3$-containing material, it will typically be present in concentrations between about 10-35% by weight.

Bodies consisting essentially of pollucite crystals can also be synthesized via a sol-gel reaction. That is, an alumina-containing sol can be prepared which provides the source of $Al_2O_3$. A glass frit having a composition ranging from about the stoichiometry of $CS_4$ to about the stoichiometry of $CS_2$ can be blended into the sol. After the reaction of the frit with the sol, the resulting gel is dried and then fired in like manner to the description above with reference to the use of powdered $Al_2O_3$-containing materials.

At the present time, the most preferred method of the invention contemplates the use of powdered aluminas to react with the frits.

Whereas in the above description the precursor glass has consisted essentially solely of $Cs_2O$, $SiO_2$, and optionally, $Al_2O_3$, it will be recognized that adjuvants and diluents, such as alkaline earth metal oxides, fining agents, $SnO_2$, $ZrO_2$, etc., can be incorporated in small amounts in the glass composition; i.e., in amounts which do not cause the development of low melting glassy phases, or cause the generation of low temperature crystal phases, or otherwise adversely affect the overall properties exhibited by the final product.

DESCRIPTION OF PREFERRED EMBODIMENTS

In the table below Glass A has a composition approximating the stoichiometry of $CS_2$ with an addition of 4% $Al_2O_3$, Glass B has a composition approximating the stoichiometry of the 910° C. eutectic of $Cs_2O$ and $SiO_2$ with an addition of 3% $Al_2O_3$, and Glass C has a composition approximating the stoichiometry of $CS_4$ with an addition of 4% $Al_2O_3$. Each composition is expressed in terms of weight percent on the oxide basis. The batch ingredients for the glasses comprised $SiO_2$, $Al_2O_3$, and $Cs_2CO_3$, the latter providing the source of $Cs_2O$.

The batch ingredients were ballmilled together to assist in obtaining a homogeneous melt, charged into platinum crucibles, and the crucibles moved into a furnace operating at about 1650° C. After 16 hours the melts, being sufficiently fluid, were poured through water cooled steel rolls to form thin ribbon/flakes of glass which were subsequently dry ballmilled to particles having a mean size of about 8-10 microns.

TABLE

|  | GLASS A | GLASS B | GLASS C |
|---|---|---|---|
| $Cs_2O$ | 67.2 | 57.6 | 52.8 |
| $SiO_2$ | 28.8 | 39.4 | 43.2 |
| $Al_2O_3$ | 4.0 | 3.0 | 4.0 |

EXAMPLE I

After calcining the frit of Glass A for several hours at 600° C. to eliminate any adsorbed water from the surface of the particles, the frit was thoroughly mixed with powdered dehydrated kaolin having a mean particle size of about 1.5 microns, the frit constituting approximately 60% by weight of the mixture. About 5% by weight of an organic binder/pressing aid was admixed thereinto and the mixture then pressed at room temperature into circular pellets having a diameter of about 0.5" (~1.27 cm) and a height of about 1" (~2.54 cm).

The pellets were introduced into an electrically-fired furnace and the temperature raised therein at about 300° C./hour to either 1250° C. or 1550° C. After a dwell period of two hours at either temperature, the furnace was cooled at a rate of about 300° C./hour. X-ray diffractometry detected relatively little amorphous phase in any of the fired pellets. Although the concentrations of frit and kaolin were calculated to yield stoichiometric pollucite, both pollucite and $Cs_2O \cdot Al_2O_3 \cdot 2SiO_2$ were formed in approximately equal amounts. The proportions of $CS_4$ and $CS_2$ in the examples did not appear to be substantially affected by the firing temperature.

EXAMPLE II

After calcining the frit of Glass B in like manner to that described above in Example I, it was mixed thoroughly with powdered siliceous bauxite having a mean particle size of about 10 microns, the frit comprising about 80% by weight of the mixture. That mixture was pressed into circular pellets and those pellets fired at either 1250° C. or 1550° C. as set forth above in Example I.

X-ray diffractometry detected a greater proportion of residual glass than was observed in the pellets of Example I. The relatively coarse size of the bauxite is believed to have accounted for the lower reactivity between the frit and the bauxite. The predominant crystal phase was identified to be pollucite, but a substantial concentration of $Cs_2O \cdot Al_2O_3 \cdot 2SiO_2$ was also noted. In like manner to the products of Example I, the proportions of $CS_4$ and $CS_2$ in the pellets did not appear to be significantly affected by the change in firing temperature.

EXAMPLE III

A sol consisting of one part of $Al_2O_3$ per 26 parts of sol (by weight) was prepared in known manner via a slow addition of aluminum isopropoxide to an ethanol/nitric acid solution. Frit of Glass C, calcined in accordance with the procedure of Examples I and II, was added slowly to the sol, while the sol was being stirred at a temperature of about 100° C. The frit was added to yield a ratio of 1 part frit to 0.22 part sol (by weight). After several minutes the mixture gelled after which it was moved into a drier operating with an air atmosphere at 200°–250° C. to slowly volatilize off any remaining solvent. After several hours in the drier, the mixture was transferred to a furnace operating at 600° C. to remove all traces of organic materials. The dried mixture, corresponding to approximately, by weight, 85% frit and 15% A1203 (from the sol), was granulated by passing it through a 200 mesh screen (74 microns). In like manner to the description in Examples I and II, a pellet was pressed from the dried powder and fired for two hours at 1550° C.

X-ray diffractometry detected no trace of an amorphous phase. Pollucite constituted essentially the sole crystal phase present. The product evidenced some porosity, however.

EXAMPLE IV

After calcining the frit of Glass C for several hours at 600° C. to eliminate adsorbed water from the surface of the particles, the frit was thoroughly mixed with two brands of powdered $Al_2O_3$, viz., A-1000 and A-3000 marketed by Alcoa. The mean particle size of the A-1000 $Al_2O_3$ was about 0.5 micron yielding a surface area of about 8.9 meters $^2$/gram, and that of the A-3000 $Al_2O_3$ was about 2.9 microns, yielding a surface area of about 2.8 meters $^2$/gram. The $Al_2O_3$ comprised about 15% by weight of the blend, that level being calculated to result in a product approximating the stoichiometry of pollucite. About 5% by weight of an organic binder/pressing aid was admixed into each blend and the blends were then pressed at room temperature into pellets having the approximate dimensions of those described in Examples I, II, and III.

The pellets were moved into an electrically-fired furnace and the temperature raised therein at about 300° C./hour to either 1250° C. or 1550° C. After a dwell period of about two hours, the furnace was cooled at a rate of about 300° C./hour.

X-ray diffractometry of the pellets containing A-1000 $Al_2O_3$ indicated the presence of but a very small amount of residual glass and, except for a very small amount of unreacted $\alpha$-$Al_2O_3$, the crystallization was identified as pollucite. Thus, the fired pellets were essentially phase-pure pollucite. However, the pellets exhibited some porosity and were measured at 85% of the theoretical density of natural pollucite.

X-ray diffractometry of the pellets containing A-3000 $Al_2O_3$ indicated glass and unreacted $\alpha$-$Al_2O_3$ particle contents higher than those present in the pellets containing A-1000 $Al_2O_3$, and the levels of pollucite crystallization were lower. On the other hand, porosity was virtually non-existent and the pellets measured very close to theoretical density.

This difference in microstructure has been theorized to be due to the larger particle size of the A-3000 $Al_2O_3$ with consequent lower surface area to react with the frit. Hence, the coarser $Al_2O_3$ particles permit greater flow of frit to reduce porosity in the pellets.

Therefore, the highest density, coupled with the greatest growth of pollucite crystallization, can be obtained through a combination of A-1000 and A-3000 aluminas.

I claim:

1. A method for making a highly crystalline article wherein pollucite constitutes the predominant crystal phase which comprises the steps of:
    (a) melting a batch for a glass having a composition varying from approximately the stoichiometry of $Cs_2O \cdot 2SiO_2$ to approximately the stoichiometry of $Cs_2O \cdot 4SiO_2$;
    (b) cooling the melt to a glass body;
    (c) comminuting said glass body to form a frit;
    (d) mixing said glass frit with an $Al_2O_3$-containing material in the proper proportions to produce a product having a stoichiometry approximating that of pollucite; and then
    (e) firing said mixture at a temperature of at least about 1000° C., for a time sufficient to react said glass frit with said $Al_2O_3$-containing material to thereby produce a highly crystalline article containing pollucite as the predominant crystal phase.

2. A method according to claim 1 wherein said glass also contains about 1–5% $Al_2O_3$.

3. A method according to claim 1 wherein the mean particle size of said frit does not exceed about 30 microns.

4. A method according to claim 3 wherein the mean particle size of said frit ranges between about 2–20 microns.

5. A method according to claim 1 wherein said $Al_2O_3$-containing material is in the form of a powder.

6. A method according to claim 5 wherein the mean particle size of said $Al_2O_3$-containing material does not exceed about 10 microns.

7. A method according to claim 5 wherein said $Al_2O_3$-containing material is an alumina.

8. A method according to claim 1 wherein said firing temperature does not exceed 1650° C.

9. A method according to claim 1 wherein said firing temperature ranges between about 1100°-1550° C.

10. A method according to claim 1 wherein said glass having a composition approximating the stoichiometry of $Cs_2O \cdot 2SiO_2$ consists essentially, expressed in terms of weight percent on the oxide basis, of 65–75% $Cs_2O$ and 25–35% $SiO_2$.

11. A method according to claim 10, wherein said glass also contains 1–5% $Al_2O_3$.

12. A method according to claim 1 wherein said glass having a composition approximating the stoichiometry of $Cs_2O \cdot 4SiO_2$ consists essentially, expressed in terms of weight percent on the oxide basis, of 50–60% $Cs_2O$ and 40–50% $SiO_2$.

13. A method according to claim 12 wherein said glass also contains 1–5% $Al_2O_3$.

14. A method according to claim 5 wherein said glass has a composition approximating the stoichiometry of $Cs_2O \cdot 2SiO_2$ and wherein said $Al_2O_3$-containing material is an alumina which is present in an amount between about 10–35% by weight.

15. A method according to claim 5 wherein said glass has a composition approximating the stoichiometry of $Cs_2O \cdot 4SiO_2$ and wherein said $Al_2O_3$-containing material is an alumina which is present in an amount between about 10–35% by weight.

16. A method according to claim 5 wherein said $Al_2O_3$-containing material comprises a mixture of at least two aluminas of different mean particle sizes or surface areas.

17. A method according to claim 1 wherein said $Al_2O_3$-containing material is in the form of a sol.

* * * * *